Aug. 28, 1956     E. H. BLACK, JR     2,760,466
ROTARY INTERNAL COMBUSTION ENGINE
Filed Dec. 2, 1953     6 Sheets-Sheet 2
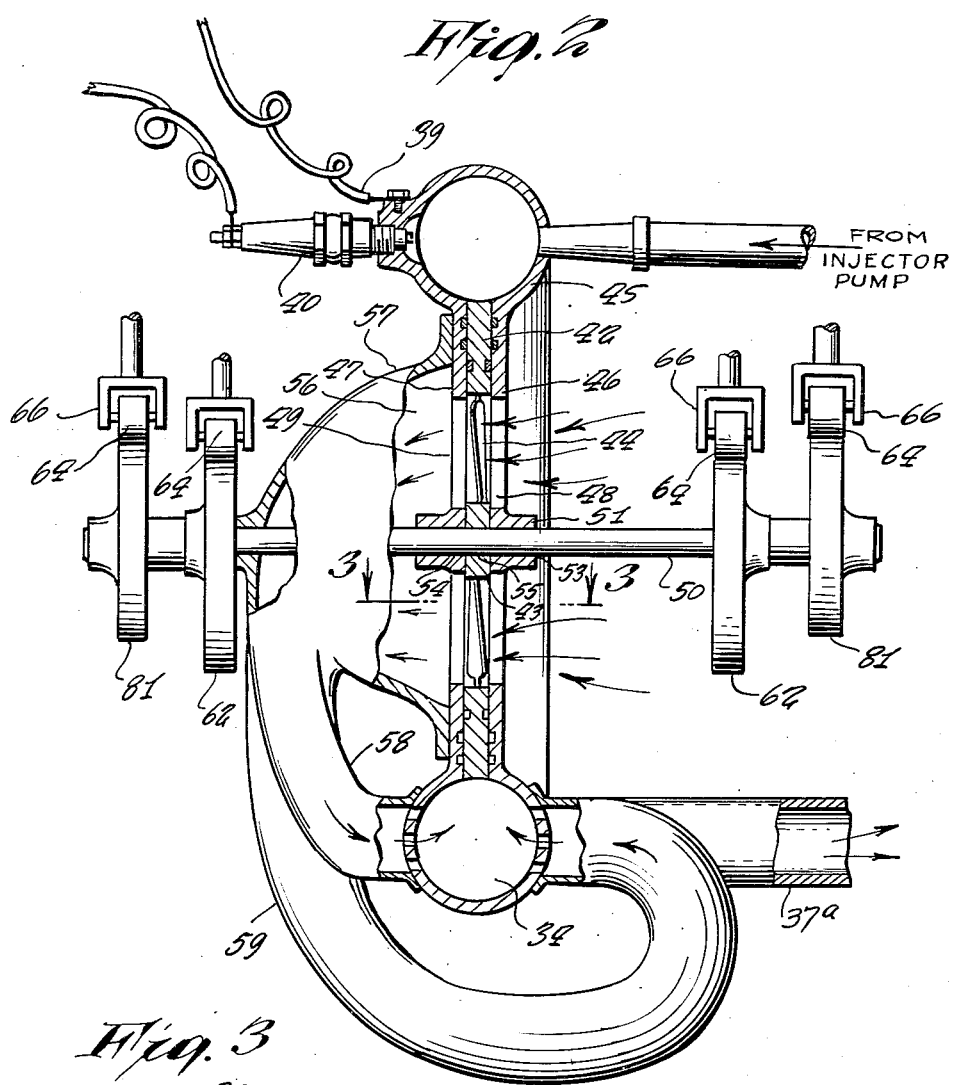
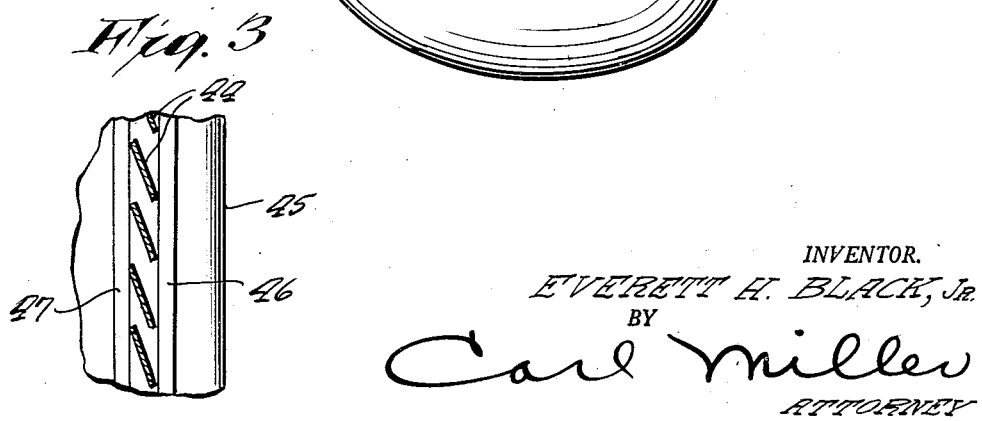
INVENTOR.
EVERETT H. BLACK, JR.
BY
Carl Miller
ATTORNEY

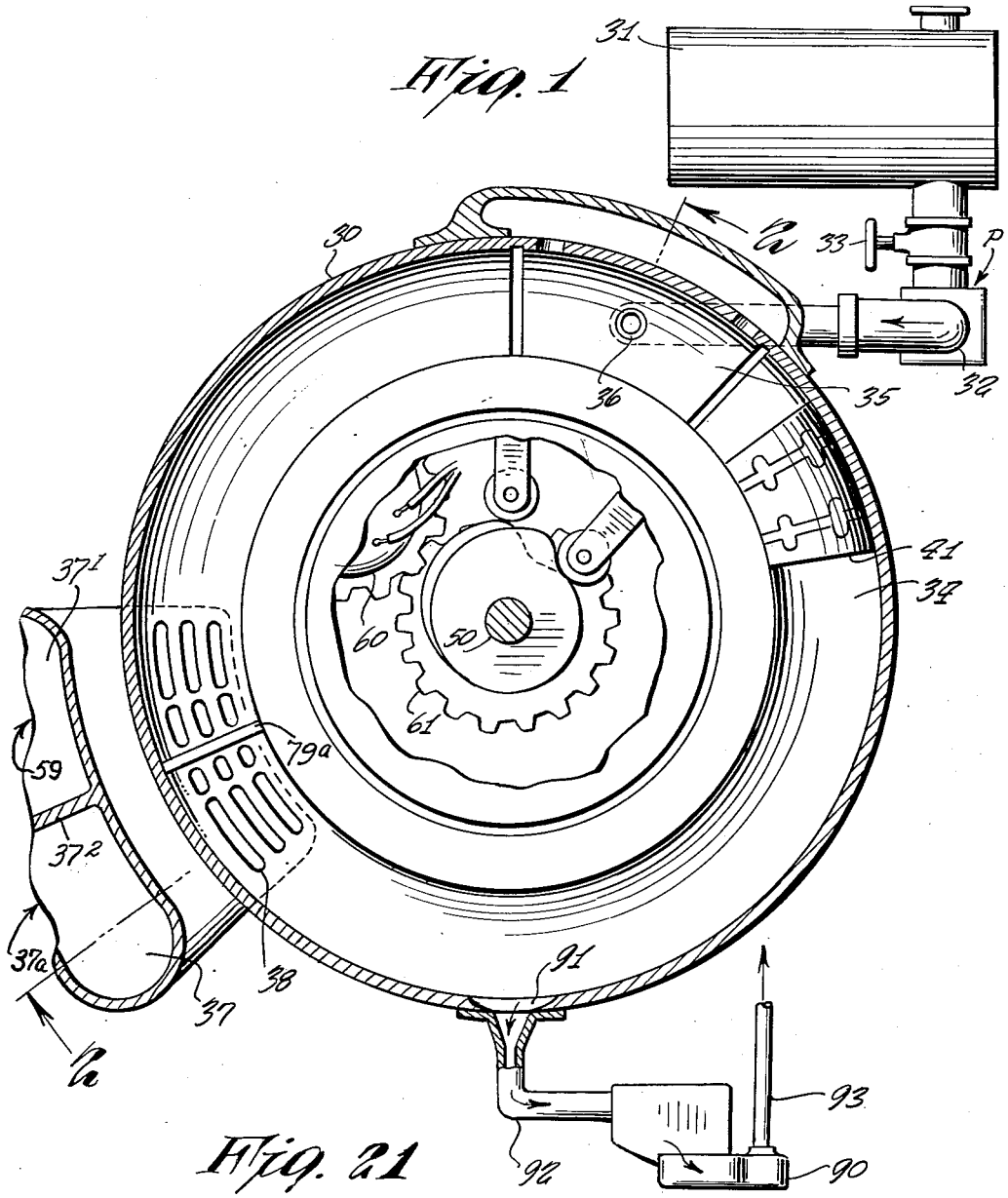

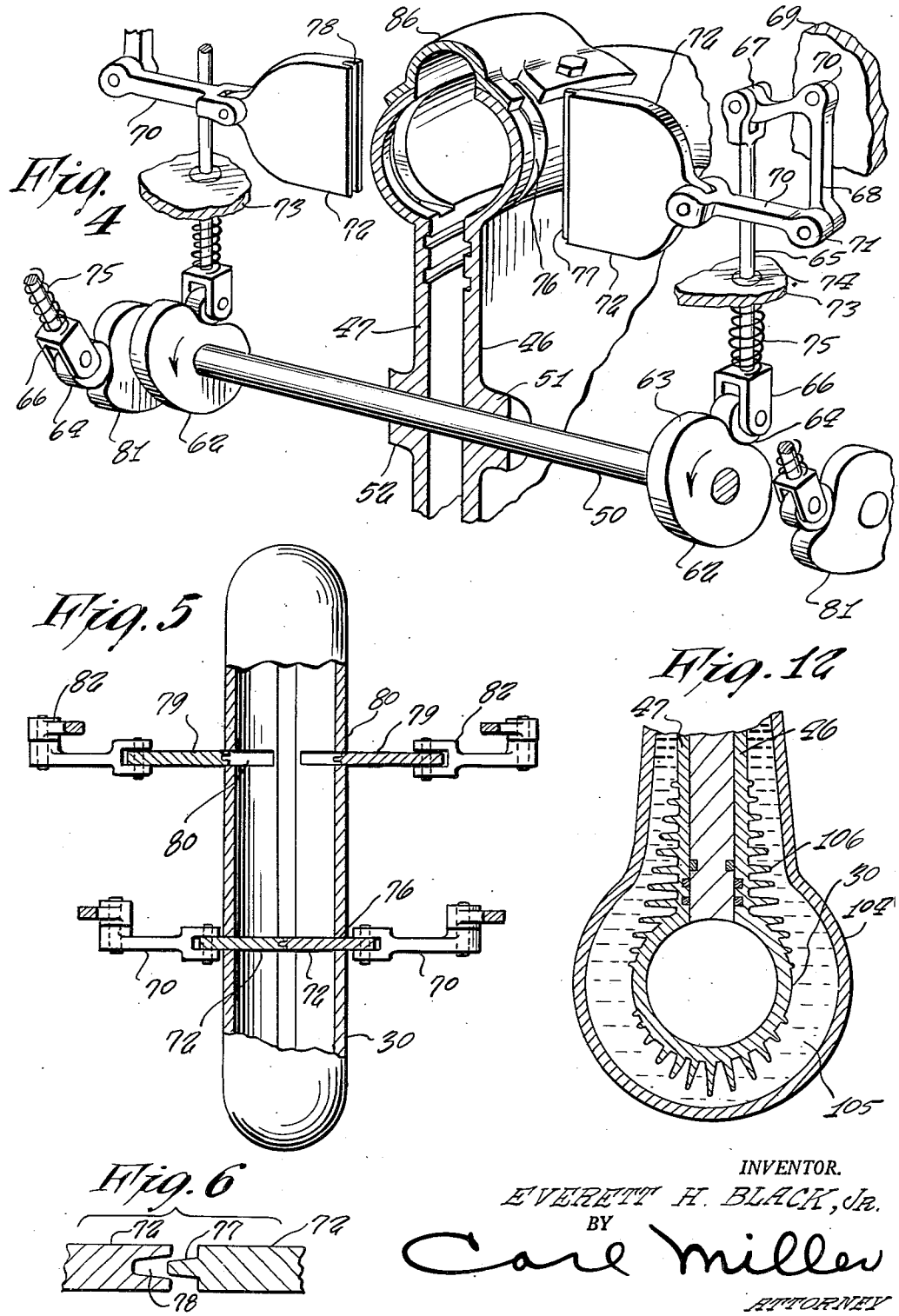

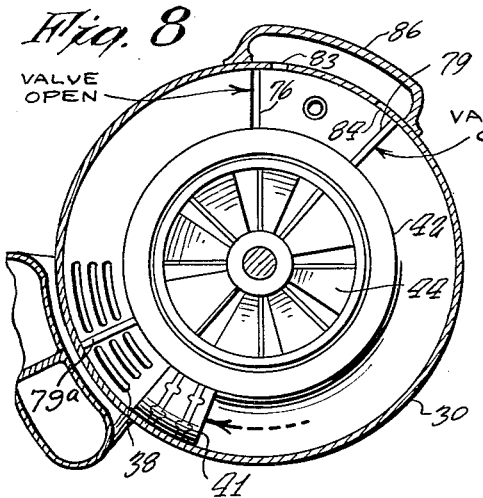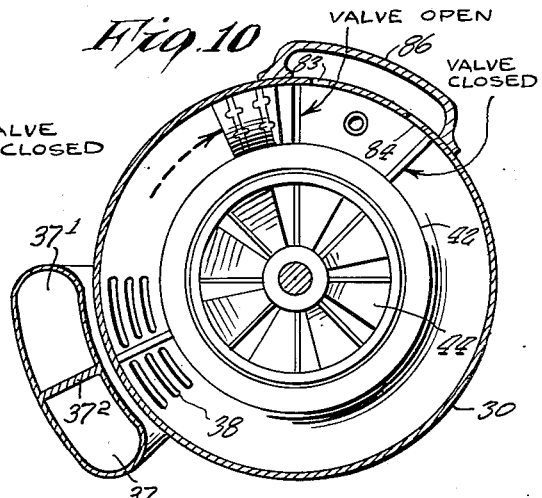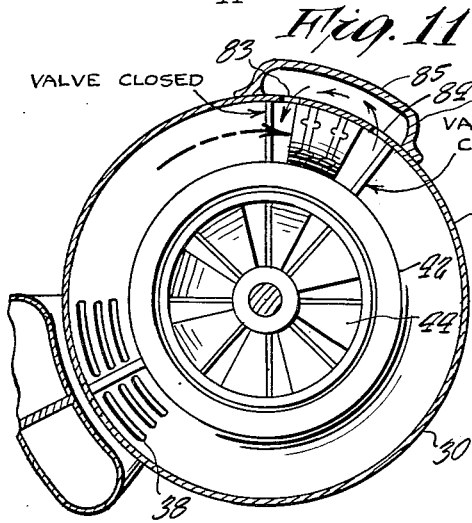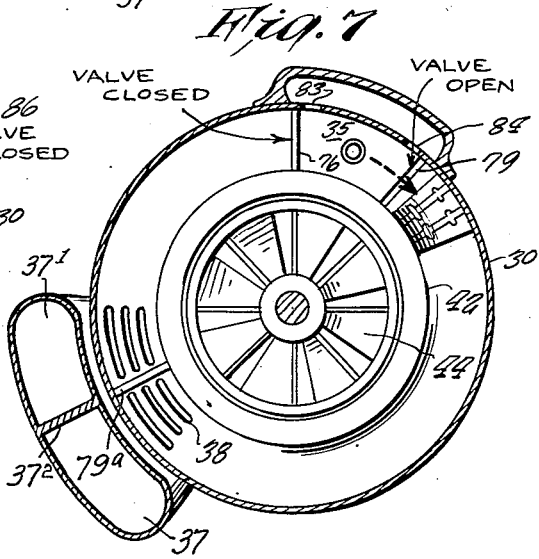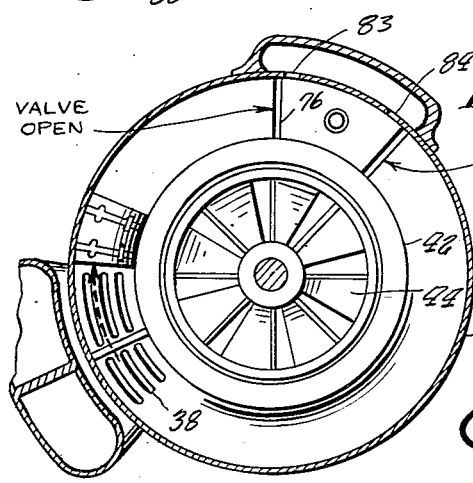

Aug. 28, 1956 E. H. BLACK, JR 2,760,466
ROTARY INTERNAL COMBUSTION ENGINE
Filed Dec. 2, 1953 6 Sheets-Sheet 5
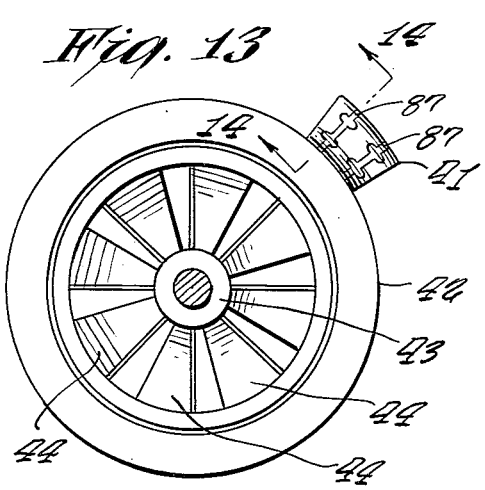
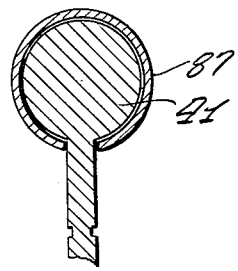
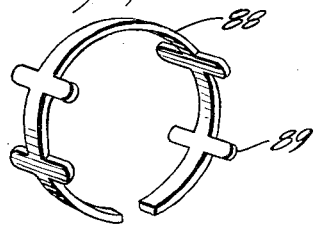
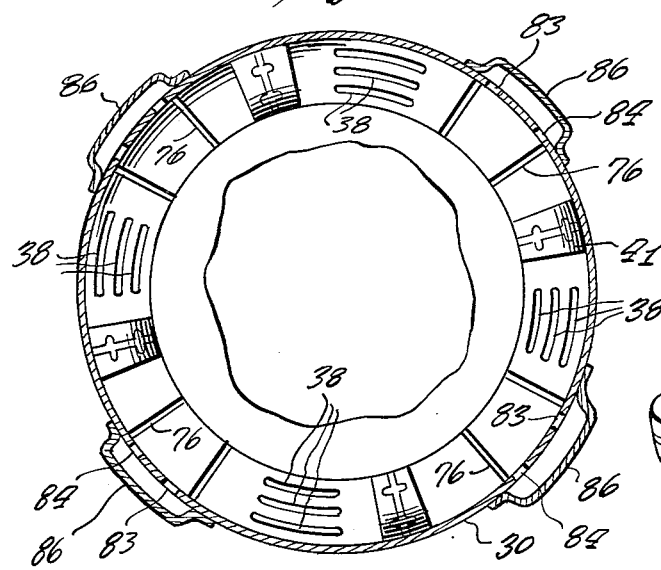
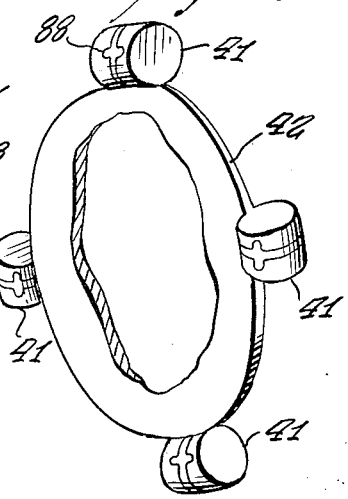
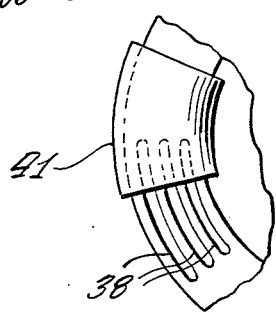
INVENTOR.
EVERETT H. BLACK, JR.
BY Carl Miller
ATTORNEY Aug. 28, 1956  E. H. BLACK, JR  2,760,466
ROTARY INTERNAL COMBUSTION ENGINE
Filed Dec. 2, 1953  6 Sheets-Sheet 6
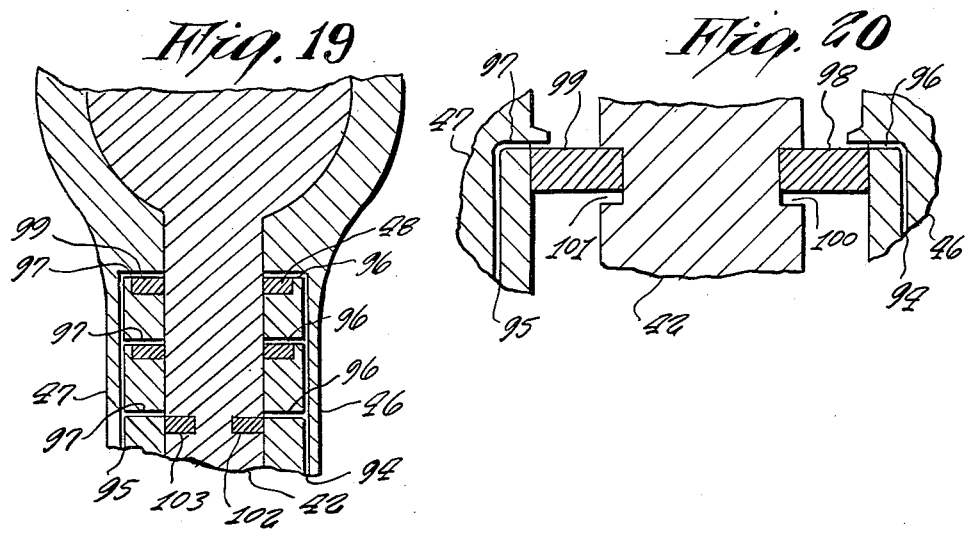
INVENTOR.
EVERETT H. BLACK, JR.
BY
Carl Miller
ATTORNEY United States Patent Office 2,760,466
Patented Aug. 28, 1956

2,760,466

ROTARY INTERNAL COMBUSTION ENGINE

Everett H. Black, Jr., Gardner, Mass.

Application December 2, 1953, Serial No. 395,781

1 Claim. (Cl. 123—13)

This invention relates to the provision of a comparatively simple, inexpensive, efficient and durable rotary internal combustion engine which will exert a substantially continual non-pulsating turning moment upon the power shaft.

This is a continuation-in-part of my application for U. S. patent on invention for Rotary Internal Combustion Engine, Serial No. 263,860, filed December 28, 1951, now abandoned.

In the linearly reciprocating piston type of combustion engine, the compression volume and expansion volume necessarily are equal, being limited by the piston stroke and cylinder capacity, thereby resulting in a relatively high terminal pressure for the expanding gases and an accompanying loss in efficiency. To remedy this objection, the present invention contemplates a motor wherein the volume of the spent gases is substantially greater than the precompression volume whereby a maximum of energy is extracted from each charge of fuel. Moreover, by providing a relatively low terminal pressure, the ingress of air is facilitated ensuring a proper air-fuel ratio.

A further object of this invention relates to the provision of a rotary internal combustion engine having a toroidal piston chamber with a piston reciprocating therein in curvilinear fashion, the piston being carried by a disc which is attached to shaft, rotation of the shaft causing the actuation of valves which control a firing chamber formed as part of the piston chamber.

A further object of this invention relates to extract high torque on the power shaft thru the extreme and constant lever arm measured from the center of the piston head to the center line of the shaft.

A still further object of the invention relates to the provision of an engine of the above described type, wherein the disc rotation causes the intake of air for the firing chamber.

A still further object of this invention resides in the provision of cam and linkage means for the above type engine, whereby shaft rotation causes the movement of sets of opposing valve plates guided by slots in the piston chamber wall, and having interlocking portions for blocking off flow through the firing chamber.

A still further inventive object resides in the provision of a fuel bypass about the piston when located in the firing chamber.

A still further object of the invention resides in the provision of lubrication means for the above type engine.

A still further object of this invention resides in the provision of guide bands for the piston to bridge the valve slots.

A still further object of this invention resides in the provision of cooling means for the engine of the above type.

A still further object of the invention resides in the provision of a rotary engine having a plurality of firing chambers and pistons arranged about a toroidal piston chamber.

A still further object of this invention resides in the provision of a rotary engine comprising a bank of the above type units arranged in parallel fashion about a common power shaft.

A still further object of this invention resides in the provision of a bank of rotary engines in combination with an airplane propeller and wing.

Generically, the invention comprises a torus shaped peripheral chamber connected to a centrally disposed hollow disc. A rotor is contained within the disc for relative rotary motion thereto. Impellor elements receive the impact of the exploding fuel charge and impart a rotary motion to the rotor which in turn actuates a power shaft. A portion of the toroidal chamber is confined intermittently by valve elements to form the combustion chamber. Air is injected into the combustion chamber by a rotation of the rotor. By providing the rotor with inclined vanes, air is sucked into the toroidal chamber in a fan-like fashion, whereupon the rotor impellers force the air into the combustion chamber. The valves which control the combustion chamber are actuated by an adequate mechanical linkage operated by the rotation of the power shaft. Initial actuation is provided by an auxiliary starting motor.

Other objects and structural details will be apparent from the subjoined description taken in connection with the drawings forming a part of the specification, and in which Figure 1 is a plane view of the engine assembly with the pertinent parts in cross-section.

Figure 2 is a side view of the engine with the parts intersected by section 2—2 of Figure 1 shown in cross-section.

Figure 3 is a cross-sectional view taken along section 3—3 of Figure 2.

Figure 4 is a perspective view of the engine cylinder shown in relation to the valve elements.

Figure 5 is a cross-sectional view taken through the compression chamber and valve elements.

Figure 6 is a cross-sectional view of the sealing portions of the valve structure.

Figures 7 through 11 are schematic representations of the piston member in various pertinent positions, relative to the combustion chamber and valve position.

Figure 12 is a cross-section taken through the air-cooled compression chamber.

Figure 13 is a detailed plan view of the piston rotor.

Figure 14 is a cross-section taken through the plane 14—14 of Figure 13.

Figure 15 is a perspective view of the piston guide band.

Figure 16 is a perspective view of a modification of the engine cylinder and piston rotor assembly.

Figure 17 is a perspective view of the modified piston rotor of Figure 16.

Figure 18 is a plan view of the relation between the piston element and the air intake ducts.

Figure 19 is a cross-section taken through an assembly of the engine cylinder and piston rotor depicting in particular the cylinder-rotor wear rings and lubricating ducts.

Figure 20 is a cross-section showing an expanded detailed view of the rings and ducts of Figure 19.

Figure 21 is a fragmentary view of the sump.

Referring to the drawings, the general organization of the novel rotary motor is depicted in Figures 1 and 2 comprising the toroidal motor housing 30 connected to the fuel reservoir 31 through the ducts 32, the flow therethrough being controlled by the valve 33. The piston chamber 34 formed annularly in the housing 30 includes the firing chamber 35 which receives a charge of fuel through the inlet means 36. Air for combustion purposes is injected into the chamber 34 through an air intake. Intake duct 37' is connected to chamber 34 in such a manner as to cause opposing air flow to fill chamber 34. The duct terminates at the slot 38 in chamber 34. Said slots 38 in chamber 34 allow air flow across the chamber 34 from the duct 37 to an exhaust duct 37a. The flow of air across chamber 34, thus induced, causes the spent gases to be blow out into free air in much the same manner as the conventional two-cycle internal combustion engine.

If any objectionable mixing of intake and exhaust should occur, a valve 79a as shown in Fig. 4, is placed across the chamber 34 at the point of division of the intake duct 37. This valve 79a would be in the closed position at all times except opened briefly to allow passage of the piston 41 by means of conventional cam operation operatively connected with the shaft.

A fuel injector pump P common to diesel engines, would be included in Figure 1 just downstream from valve 33. This would be interconnected with an air control to vary the volume of intake air as the pump stroke changes to provide conventional throttle control.

An explosive mixture of air and fuel is thus provided and forced into the firing chamber 35 and ignited by the electrical means 39 (see Figure 2) connected to the firing chamber 35 by the threaded means 40. The energy released by the explosion is directed against the impellor piston 41 (see Figure 1) which reciprocates curvilinearly in the bore of the chamber 34. The position of the piston 41 is so timed that the explosions take place when the piston passes through a particular location in the firing chamber 35. Communication between the firing chamber 35 and the remainder of the chamber 34 is controlled by means of a dual valve system synchronized to confine the chamber 36 at certain desired time intervals. This valve system will be described in more detail hereinbelow.

Referring to Figure 13, the piston rotor assembly is shown in more detail comprising the aforementioned piston 41 formed at the periphery of the rotor disc 42 having the central bearing portion 43 and the intermediate air vanes 44 the purposes of which will be more fully described hereinafter.

Referring to Figure 2, the rotor disc 42 is shown in its assembled relation to the housing 30. The said housing comprises the annular chambered portion 45, the inner peripheries thereof being connected by the spaced discs 46 and 47. The space between said discs forming a slot to receive the rotor disc 42. To permit the passage of air through the discs 46 and 47, the annular perforations 48 and 49 are provided centrally, the diameter of the said perforations being substantially that of the air vane area.

So as to receive the power shaft 50 (see Figure 2), the discs 46 and 47 are provided with the bearing hubs 51 and 52, formed of a lead silver alloy and bored at 53 and 54 respectively. The rotor disc bearing portion 43 is bored at 55 to receive the power shaft 50 which is keyed thereto. Thus when the rotor disc 42 experiences rotary motion, air is drawn through the perforations 48 and 49 by the action of the air vanes 44 in the direction indicated by the arrows in Figure 2. The inclination of the vanes 44 is more clearly shown in the sectional view of Figure 3.

Thus it is apparent that perforations 48 and 49 form an inlet means for the air required to produce the explosive mixture. The air passing through 48 and 49 flows through the chamber 56 formed in the intake housing 37'. Extending from the housing 37' are the conduits 58 and 59 through which air flows from chamber 56 to the piston chamber 34. As mentioned hereinbefore (see Figure 1) inlet slots 38 are provided in the housing 30 to cause communication between the ducts 58, 59 and the chamber 34.

An auxiliary starting means 60 (see Figure 1) provides sufficient initial rotor movement to introduce an explosive mixture into the firing chamber 35. The explosion of the said mixture causes continued actuation of the piston rotor. The starting means 60 is schematically shown and can be located as desired along the power shaft. The shaft 50 is provided with the gear means 61 to coact with the starting means 60.

Referring to Figure 4, the synchronized dual valve mechanism is depicted, comprising the cams 62 connected to the shaft 50, whereby rotary motion of 50 causes the cam surfaces 63 to bear upon the roller elements 64. Since links 65 carrying the brackets 66 to which are attached the rollers 64, are restrained from lateral motion, the thrust of the cams 62 upon the rollers 64 causes linear upward motion of the rods 63 relative to the shaft 50 as seen in Figure 4. Connected to the rods 65 by the pivot means 67 are the V-shaped links 68 pivoted to a fixed housing member 69 at 70. The other ends of the links 68 are pivotally connected to the links 70 at 71 which in turn carry the valve plates 72. The actuating rods 65 are restricted to upward linear motion by the fixed housing members 73 perforated at 74 to snugly receive the rods 65. The underside of members 73 also act as abutments for the springs 75 which act upon the brackets 66, thereby biasing the valves 72 to the open position.

Slots 76 are formed in the walls of chamber 35 to receive the valve plates 72. The passage through chamber 35 is blocked by the interlocking locking coaction of the valve plates 72 as better seen in Figure 6 wherein one of the plates 72 is formed with a male portion 77 and the other plate is formed with a female groove to receive portion 77. It is thus seen that rotary motion of the shaft 50 results in linear motion of the valve plates parallel to the shaft axis and transverse to the housing 30. The valves being biased to the open position by the springs 75 and forced towards the closed position by the cams 62.

As seen in Figure 5, the chamber 35 is provided with a second set of valves 79 spaced from the first valve set 72 and received in the radial grooves 80.

The second valve set 79 is actuated by linkage mechanisms similar to that described in connection with valve set 72; the actuating cams 81 for the second set being attached to the power shaft 50 at points outwardly of the cams 62. The linkage mechanisms 82 for the second valve set being arranged to cause valve reciprocation along a radial plane offset from the first valve set 72, as indicated in Figure 5. The cams 62 and 81 are so designed that the valve sets will open and close at certain specific time intervals dependent upon the position of the piston 41. Thus it is seen that the rotation of shaft 50 causes a predetermined sequence of valve movement in addition to the intake of air heretofore described.

In Figure 7, the piston 41 is shown in a position just after leaving the firing chamber 35 where an explosion has occurred. Since valves 72 are closed and valves 79 are open, the expanding gases will drive the piston clockwise to the position shown in Figure 8. In traveling that distance a new supply of air is drawn in through slots 38 and forced into the chamber area included between the slots clockwise to the now closed valves 79. Further movement of piston 41 results in both valve sets being open thereby allowing the expulsion of exhaust gases. Both valves remain open long enough to ensure complete expulsion of exhaust gases and then valves 79 close when the piston reaches the position shown in Figure 10. Continued piston movement now causes the air between the piston and valves 79 to be compressed. Although it is apparent that by properly proportioning the firing chamber volume relative to piston position corresponding to the closing of valves 79, any desired compression ratio can be produced, a compression ratio of 1 to 7 has been found particularly effective. Further piston movement carries the piston across the slots for valves 72. Fuel can now be injected into the firing chamber to form a combustible mixture. Passages 83 and 84 are formed in the outer wall of the firing chamber and communicate with a bypass chamber 35 formed by the casing 86 attached externally to the casing 34. Thus it is apparent that when the piston has entered the firing chamber and both valve sets are closed, the fuel mixture which becomes trapped between the piston and valves 79 will flow via the bypass to the region between the piston and valves 72, as shown in Figure 11. Ignition occurs just as the piston reaches 79 which open substantially simultaneously with the time of ignition, thereby permitting the piston to be forwardly propelled to the starting position of Figure 7. It should also be noted that the terminal pressure of the exhaust gases present in the chamber during the position of Figure 9 must be greater than the pressure differential across the slots 38 caused by the rotor air vanes in order to permit the escape of such exhaust gases.

So that the piston 41 can easily pass over the valve slots 80 and 76, the said piston is provided with the valve guides 87 (better seen in Figures 13, 14 and 15) comprising the circular band 88 and the longitudinal slides 89. These guides are easily replaceable and made from a corrosion resisting durable metal thereby reducing frictional wear and tear of the piston. The slides are sufficiently long and so formed that the valve slots are efficiently bridged.

Referring to Figure 18, it is seen that the exhaust and intake of gases through slots 38 are gradually throttled by the piston 41 as opposed to an abrupt opening and closing action.

In Figure 16 a modification is depicted having a plurality of firing chambers, pistons and intake slots. By providing a multiplicity of firing chambers a smoother non-pulsating motion is imparted to the piston. Obviously the mechanisms controlling the valve action must be designed to give the proper sequence of valve motion to cause a complete cycle of piston movement. As seen in Figure 17 the piston rotor carries a multiplicity of impellor pistons. Although four pistons are herein depicted, it is apparent that any number of pistons is contemplated.

Referring to Figure 1, it is seen that lubrication for the moving parts is provided by the pump 90. The lubricant is returned to the pump through the sump 91 and the outlet conduit 92, (see Figure 21). From the pump 90 lubricant flows through conduit 93 to the ducts 94 and 95 (as shown in Figure 19), which are formed in the discs 46 and 47. Branch ducts 96 and 97 provide access for the lubricant to the bearing between the rotor 42 and the discs 46 and 47. Rotor rings 98 and 99 are provided along the internal faces of the discs 46 and 47 respectively. Referring to Figure 20, the ring structure is shown more clearly with the clearances greatly magnified. The rotor 42 is provided with the circular grooves 100 and 111 which receive and guide the rotor rings 98 and 99 respectively. Additional wear rings 102 and 103 are provided in the bearing faces of the rotor 42.

Thus lubricant from the pump is fed via ducts 94, 95, 96 and 97, to the bearing faces of the moving parts; the returning lubricant being collected in sump 91 from whence it flows to the pump 90.

During the rotation of the rotor, some of the lubricant will be introduced to the chamber 34 by gravity or centrifugal force thereby providing lubrication between the piston and chamber bore.

In the modification of Figure 12 the discs 46 and 47 and the chamber housing 30 are enclosed by the casing 104 to provide the chamber 105, containing a cooling medium such as air or the like. To accelerate the dissipation of heat from the rotor casing 30 and the discs 46 and 47, the fins 106 are provided.

In operation the starting motor 61 imparts rotary motion to the power shaft 50 whereupon the rotor 42 is actuated, causing air to be drawn into the firing chamber 35 by the air vanes 44. In accordance with the description of Figures 7 thru 11, an explosive fuel mixture is ignited at predetermined time intervals to actuate the piston 41. Rotation of the power shaft 50 also causes valve actuation as hereinbefore described. Exhaust gases are expelled regularly through the slots 38, lubrication for the moving parts to be provided by the lubrication system previously described.

It is desired that it be understood that other environments and uses for the above described rotary engine are contemplated herein, and that numerous changes in shape, size and formation of the various structural elements may be resorted to within the spirit of the invention and scope of the appended claim.

Having thus set forth and disclosed the nature of this invention, what is claimed is:

A rotary internal combustion engine comprising a toroidal piston chamber in combination with a piston adapted to rotate curvilinearly in said chamber, said piston formed at the outer periphery of a rotor disc extending through the inner periphery of the chamber, a power shaft secured centrally to the disc and extending transversely thereof, the chamber, disc and shaft being coaxially arranged, said chamber comprising a firing chamber, valve means confining the firing chamber at predetermined intervals, said valve means being responsive to shaft rotation, ignition means communicating with the firing chamber, means for introducing fuel to the firing chamber, and means for introducing air to the piston chamber at a point remote from the firing chamber, said piston acting as a valve means at predetermined intervals to control the inflow of air and the outflow of gases, said piston position being timed relative to the first said valve means movement to alternately predeterminately cause the inflow and outflow of air and gases from the fourth said means, the terminal gas pressure of the exhaust gases being greater than the pressure drop caused by the means causing the inflow of air, whereby exhaust gases can escape against the pressure of the incoming air when the valves are appropriately positioned, the piston position and the ignition being synchronized to cause continuous shaft rotation, said means for introducing air into the piston chamber comprising means formed centrally on the rotor disc causing an air current, ducts receiving said current, and inlet means communicating with said ducts and said piston chamber whereby rotor motion provides air for combustion purposes, and said toroidal piston chamber being connected to inner spaced parallel discs, the space therebetween communicating with the piston chamber at its inner periphery, the rotor disc being snugly received between the spaced discs for rotary motion relative thereto, and said spaced discs having central perforations adjacent the means causing the air current, one of said discs communicating with the said ducts, the inlet means comprising slots formed in the piston chamber housing, and said air current causing means comprises vanes inclined to the rotor disc plane and arranged circularly about a central hub at spaced intervals, said hub being keyed to the power shaft.

References Cited in the file of this patent

UNITED STATES PATENTS

| | | |
|---|---|---|
| 1,186,879 | Brush | June 13, 1916 |
| 1,199,235 | Boyd | Sept. 26, 1916 |
| 1,431,017 | Martin | Oct. 3, 1922 |
| 1,955,461 | Hickerson et al. | Apr. 17, 1934 |
| 2,220,375 | Lynch | Nov. 5, 1940 |
| 2,346,646 | Beech | Apr. 18, 1944 |
| 2,412,949 | Brown et al. | Dec. 24, 1946 |